(12) United States Patent
Koch et al.

(10) Patent No.: US 7,922,897 B2
(45) Date of Patent: Apr. 12, 2011

(54) FLUIDIZED BED WASTEWATER TREATMENT APPARATUS

(75) Inventors: Fred A. Koch, Vancouver (CA); Donald S. Mavinic, North Vancouver (CA); Noboru Yonemitsu, Vancouver (CA); Ahren Thomas Britton, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 12/578,573

(22) Filed: Oct. 13, 2009

(65) Prior Publication Data

US 2010/0047134 A1 Feb. 25, 2010

Related U.S. Application Data

(62) Division of application No. 10/597,238, filed as application No. PCT/CA2004/000208 on Feb. 13, 2004, now Pat. No. 7,622,047.

(51) Int. Cl.
*C02F 1/58* (2006.01)

(52) U.S. Cl. .... 210/96.1; 210/143; 210/188; 210/195.1; 210/199; 210/205; 210/206; 422/140; 422/145; 422/147

(58) Field of Classification Search .................. 210/96.1
See application file for complete search history.

(56) References Cited

U.S. PATENT DOCUMENTS

| | | | |
|---|---|---|---|
| 3,996,018 A * | 12/1976 | Midler, Jr. ................ | 23/295 R |
| 4,009,099 A | 2/1977 | Jeris | |
| 4,389,317 A | 6/1983 | Trentelman et al. | |
| 6,592,751 B2 * | 7/2003 | Haridas ...................... | 210/97 |
| 6,994,782 B2 | 2/2006 | Bowers et al. | |
| 7,005,072 B2 | 2/2006 | Bowers et al. | |
| 7,182,872 B2 * | 2/2007 | Barak et al. ................ | 210/638 |

FOREIGN PATENT DOCUMENTS

| | | |
|---|---|---|
| DE | 3819965 A1 | 12/1989 |
| JP | 60179190 A2 | 9/1985 |
| JP | 63200888 | 8/1988 |
| JP | 11267665 A2 | 10/1999 |
| JP | 2000334474 A2 | 12/2000 |

OTHER PUBLICATIONS

Regy, S. et al., "Phosphate recovery by struvite precipitation in a stirred reactor", LAGEP, Mar. to Dec. 2001.
Piekema et al., "Phosphate Recovery by the Crystallisation Process: Experience and Developments", paper presented at the 2nd International Conference on Phosphate Recovery for Recycling from Sewage and Animal Wastes, Noordwijkerhout, The Netherlands, Mar. 12-13, 2001.

(Continued)

*Primary Examiner* — Peter A Hruskoci
(74) *Attorney, Agent, or Firm* — Oyen Wiggs Green & Mutala LLP (57) ABSTRACT

A fluidized bed reactor for removing phosphorus and nitrogen from wastewater has a column comprising a number of sections. The diameter of the column changes stepwise between the sections. A flow velocity in excess of 100 cm/min is maintained in a lowermost one of the sections and lower flow velocities are maintained in subsequent sections. A struvite supersaturation ratio is controlled in part by recycling wastewater from an outlet of the column. Struvite pellets are removed periodically from the bottom of the column.

39 Claims, 3 Drawing Sheets

OTHER PUBLICATIONS

Ueno et al., "Three years experience of operating and selling recovered struvite from full-scale plant", Environmental Technology, vol. 22, pp. 1373-1381, 2001.

Munch, E.V. et al., "Making a business from struvite crystallisation for wastewater treatment: turning waste into gold", paper presented at 2nd International Conference on Phosphate Recovery for Recycling from Sewage and Animal Wastes, Noordwijkerhout, The Netherlands, Mar. 12-13, 2001.

Parsons, S.S.A. et al., "Assessing the potential for struvite recovery at sewage treatment works", Environmental Technology, vol. 22, p. 1279, 2001.

* cited by examiner

FLUIDIZED BED WASTEWATER TREATMENT APPARATUS

CROSS REFERENCE TO RELATED APPLICATIONS

This application is a divisional of U.S. application Ser. No. 10/597,238 filed on 17 Jul. 2006, now U.S. Pat. No. 7,622,047, and entitled FLUIDIZED BED WASTEWATER TREATMENT, which is the US national phase of PCT International Application No. PCT/CA2004/000208 filed on 13 Feb. 2004 and entitled FLUIDIZED BED WASTEWATER TREATMENT, the content of which is incorporated herein by reference.

TECHNICAL FIELD

The invention relates in general to the removal of phosphorus, nitrogen and similar solutes from wastewater. The invention relates more specifically to removal of solutes from wastewater in fluidized bed reactors. In some embodiments of the invention, phosphorus and nitrogen are removed from wastewater and recovered in the form of struvite, struvite analogs, or other phosphate compounds. In some embodiments, the invention is applied to recover a product that can be used as a fertilizer.

BACKGROUND

Aqueous solutions containing significant concentrations of phosphorus and/or, nitrogen can cause significant problems if released into the environment. There are various sources for such solutions. These include sources such as leaching from landfill sites, runoff from agricultural land, effluent from various industrial processes, municipal wastewater, animal wastes such as wastewater from feedlots or other animal husbandry facilities and the like.

In such solutions, nitrogen is typically primarily present in the form of ammonia and phosphorus is typically primarily present in the form of phosphate. Many jurisdictions have laws which limit the permissible concentration of phosphorus and/or ammonia in treated wastewater discharged into the environment.

Various phosphorus removal and recovery technologies exist. Some of these technologies provide crystallization reactors. Conditions are maintained in the crystallization reactors which promote the crystallization of phosphate compounds. These include:

S. Regy et al. *Phosphate recovery by struvite precipitation in a stirred reactor*, LAGEP (March to December 2001) includes a survey of various attempts to remove phosphorus and nitrogen from wastewater by struvite precipitation.

Trentelman, U.S. Pat. No. 4,389,317 and Piekema et al., *Phosphate Recovery by the Crystallization Process: Experience and Developments*, paper presented at the $2^{nd}$ International conference on Phosphate Recovery for Recycling from Sewage and animal Wastes, Noordwijkerhout, The Netherlands, Mar. 12-13, 2001, disclose a reactor and method for precipitating phosphate in the form of calcium phosphate, magnesium phosphate, magnesium ammonium phosphate or potassium magnesium phosphate.

Ueno et al., *Three years experience on operating and selling recovered struvite from full scale plant* (2001) Environmental Technology v. 22 p. 1373 disclose the use of sidestream crystallization reactors to remove phosphate in the form of magnesium ammonium phosphate (also known as struvite).

E. V. Munch et al., *Making a business from struvite crystallization for wastewater treatment: turning waste into gold*, paper presented at the $2^{nd}$ International conference on Phosphate Recovery for Recycling from Sewage and animal Wastes, Noordwijkerhout, The Netherlands, Mar. 12-13, 2001, discloses the use of a struvite crystallization process for removing nitrogen and phosphorus from wastewater in the form of struvite.

S. A. Parsons et al., *Assessing the potential for struvite recovery at sewage treatment works*, (2001) Environmental Technology v. 22, p. 1279 survey various attempts to remove nitrogen and phosphorus from wastewater in the form of struvite.

Tsunekawa et al. Patent Abstracts of Japan No. 11-267665 discloses a reaction tower for removing phosphorus from water.

Struvite can be formed by the reaction:

A benefit of removing phosphorus and nitrogen by producing struvite is that struvite can be recovered and has value as a slow-release fertilizer.

Some of the prior processes which have produced struvite from phosphates and ammonia in wastewater produce undesirably small particles of struvite. Such small particles have diminished value as fertilizer.

There remains a need for a cost-effective methods and apparatus for removing phosphorus, nitrogen and similar solutes from wastewater and other aqueous solutions.

SUMMARY OF THE INVENTION

This invention provides methods and systems which may be applied to removing solutes such as phosphorus and/or nitrogen from aqueous solutions such as wastewater, leachate, runoff, animal wastes, effluent or the like. As noted below, the term "wastewater" is used herein to refer generally to such solutions. In many embodiments of the invention phosphorus and/or nitrogen are recovered in the form of pellets of a solid product. In some embodiments of the invention the pellets may be used for fertilizer. The pellets may comprise struvite, a struvite analog, or a phosphate compound, for example.

One aspect of the invention provides a fluidized bed reactor for use in removing solutes from wastewater. The reactor comprises a column comprising a substantially vertically oriented conduit having a harvesting section and at least two vertically sequential sections above the harvesting section. A cross sectional area of the conduit increases between adjacent ones of the sections. In some embodiments the cross-sectional area increases stepwise. The number of sections in the column may be varied. An inlet for wastewater is provided in the column in or below the harvesting section. A recycling path extends from an outlet in an upper portion of the conduit to the inlet.

In some embodiments the inlet is oriented substantially vertically and is configured to direct a turbulent jet of influent wastewater upward into the column. In some embodiments a ratio of a cross sectional area of a topmost one of the sections to a cross sectional area of the harvesting section is at least 10:1 and, in some cases, exceeds 20:1. In some embodiments, the cross sectional area of the conduit increases stepwise by a factor of at least 1½ between the adjacent ones of the sections.

Another aspect of the invention provides a method for extracting phosphorus and/or nitrogen from wastewater. The method comprises introducing the wastewater into a column comprising a substantially vertically oriented conduit having a harvesting section and at least two vertically sequential sections above the harvesting section. In the column, a cross sectional area of the conduit increases between adjacent ones of the sections. In some embodiments of the invention the cross-sectional area increases stepwise between the sections. The method maintains supersaturation conditions for struvite in the harvesting section and involves recycling wastewater which has passed through the column while controlling a struvite supersaturation ratio in the harvesting section at least in part by controlling a recycling ratio of a rate at which wastewater is recycled into the column to a total rate at which wastewater is being introduced into the column. In some embodiments a supersaturation ratio for struvite, a struvite analog, or a phosphate compound is maintained in the range of 2 to 5 within the harvesting section. In some embodiments of the invention the supersaturation ratio is in the range of 3 to 4. Pellets form within the column. The pellets may be primarily composed of struvite. The pellets are harvested from the harvesting section.

In some embodiments, extracting the pellets from the harvesting section comprises extracting the pellets at a rate such that a crystal retention time of pellets in the column is at least one week. In some embodiments the crystal retention time is in the range of 8 to 12 days. Crystal retention time is defined below.

The method may comprise controlling the pH, for example, by adding an alkaline solution into the column. The pH may be maintained to have a value in the range of 7.4 to 8.5 within the harvesting section. In some embodiments the method involves maintaining a pH not exceeding 8 in the harvesting section.

Solutions containing magnesium ions and/or ammonia may be controllably added to assist in maintaining the struvite supersaturation ratio in the desired range.

The method controls the flow of wastewater in the column. In some embodiments the method maintains an average upward flow velocity of at least 400 cm/min within the harvesting zone and an average upward flow velocity not exceeding 75 cm/min within an uppermost one of the sections. In some embodiments a ratio of the average upward flow velocity in the harvesting section to the average upward flow velocity in the uppermost section is at least 10:1 and in some cases at least 20:1.

Another aspect of the invention provides a method for extracting one or both of phosphorus and nitrogen from wastewater. The method comprises maintaining supersaturation conditions for a solid reaction product in a substantially vertically oriented column, introducing the wastewater into column, and allowing particles of the reaction product to form in the column. The method maintains the particles of the reaction product in a fluidized bed within the column. The fluidized bed spans at least three vertically sequential zones within the column. Wastewater within each of the zones has a different average upward fluid velocity such that the average upward fluid velocity is less in vertically higher ones of the zones than in vertically lower ones of the zones. The method allows particles to grow to a size sufficient to migrate downward to a harvesting zone comprising at least a portion of a lowermost one of the at least three zones and, harvests particles from the harvesting zone.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The following describes embodiments of the invention for removing phosphorus and nitrogen from wastewater in the form of struvite. This choice of example coincides with an aspect of the invention having significant commercial utility. The scope of the invention is not limited to the production of struvite except as specifically indicated in the appended claims. In some embodiments of the invention, phosphorus and/or nitrogen are removed from wastewater in the form of a struvite analog. Struvite analogs which may be produced according to the invention include: potassium magnesium phosphate. In some embodiments of the invention, phosphorus is removed from wastewater in the form of a phosphate compound such as calcium phosphate or magnesium phosphate.

For convenience, the term wastewater is used in the following description and claims to describe such aqueous solutions generally. Unless otherwise specified, "wastewater" is not limited to effluent from municipal sewage, animal waste, or any other specific source.

Figure 1:
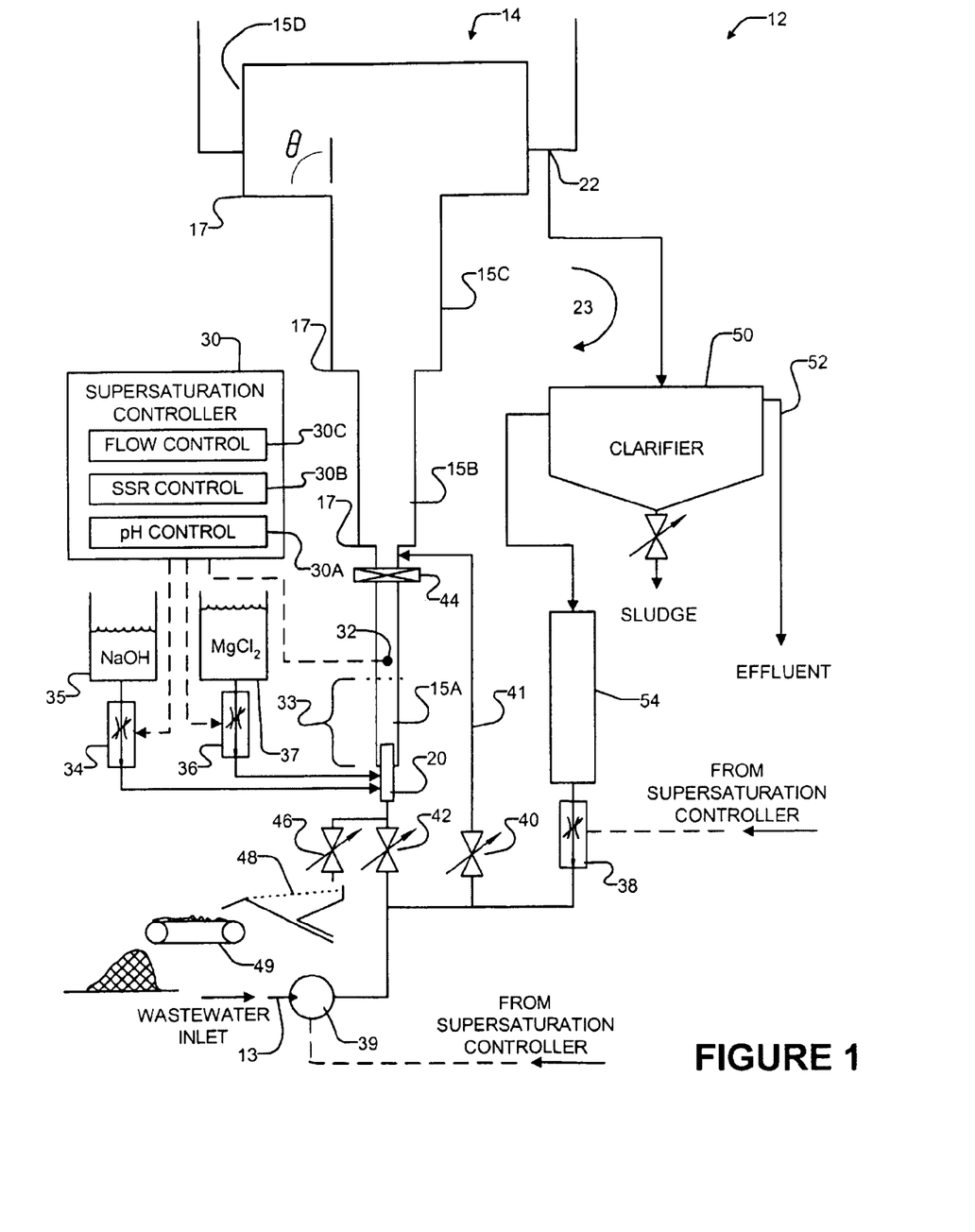
FIG. 1 is a block diagram of fluidized bed reactor according to one embodiment of the invention.

FIG. 1 shows a fluidized bed reactor system 12. System 12 has an inlet 13 which receives wastewater from, for example, a municipal, industrial or agricultural wastewater treatment facility. The wastewater contains phosphorus and/or nitrogen which it is desired to remove. The following example describes an application of the invention to remove phosphorus from wastewater.

Where it is desired to target phosphorus for removal, the concentrations of species within column 14 can be maintained at levels such that it is the concentration of phosphorus that limits the reaction to produce an end product such as struvite. Those skilled in the art will realize that one could also target ammonia for removal by adjusting the concentration of species within column 14 so that the concentration of ammonia limits formation of the end product.

In this example the phosphorus is in the form of phosphate ($PO_4^{3-}$) and related species such as $HPO_4^{2-}$. The phosphate concentration in the wastewater may be in the range of 50 mg/L to 200 mg/L, for example.

System 12 comprises a substantially vertical column 14. Column 14 has a number of vertically sequential sections. The illustrated reactor has four sections 15A, 15B, 15C and 15D (collectively sections 15). Section 15A may be termed a "harvesting section" because pellets formed within column 14 can be extracted from section 15A after they have grown to a suitable size, as described below. In the illustrated embodiment, column 14 has a step discontinuity 17 at the boundary between each pair of adjacent sections 15. The cross sectional area of column 14 changes stepwise at each step discontinuity 17.

The term "step-like transition" is used herein to refer to transitions between sections 15 wherein the angle θ (see FIG. 1) between the wall of a section below a step-like transition and the transition is 80 degrees or greater. It is currently believed that providing stepwise transitions, or at least step-like transitions, between sections 15 enhances the size-classification of particles within column 14, particularly where the transitions are located near the top of column 14.

The dimensions of column 14 and the number of sections 15 may be varied depending upon the volume of wastewater to be treated as discussed further below. In some small-scale prototype embodiments of the invention, each of the segments is cylindrical. Table I provides segment diameters as used in several prototype embodiments of the invention.

TABLE I

SEGMENT DIAMETERS IN SOME PROTOTYPES

| PROTOTYPE | SEGMENT DIAMETER (cm) | | | |
|---|---|---|---|---|
| | 15A | 15B | 15C | 15D |
| 1 | 4 | 5.2 | 7.7 | 20 |
| 2 | 4 | 5.2 | 7.7 | 20 |
| 3 | 7.7 | 10.2 | 15.2 | 40 |
| 4 | 7.7 | 10.2 | 15.2 | 40 |

The ratio of the cross-sectional area of the uppermost section 15 to that of the lowermost section 15 is typically 10:1 or more and may be 20:1 or greater still. For example, in prototype 1 of Table 1, the ratio of the cross sectional area of section 15D to section 15A is about 25:1. The ratio of cross-sectional areas of adjacent sections 15 is typically in the range of 1.5:1 to 10:1 with the cross-section increasing toward the top of column 14.

In some embodiments, the cross sectional area of adjacent segments increases by a factor of at least 1½. The cross sectional area may increase by a larger factor between a next-to-topmost one of the sections and a topmost one of the sections. For example, in some embodiments, the topmost one of the sections has a cross sectional area in excess of 5 times a cross sectional area of the next-to-topmost one of the sections.

The lengths of the segments in the prototype reactors are given in Table II.

TABLE II

SEGMENT LENGTHS IN SOME PROTOTYPES

| PROTOTYPE | SEGMENT LENGTH (cm) | | | |
|---|---|---|---|---|
| | 15A | 15B | 15C | 15D |
| 1 | 101 | 108 | 250 | 46 |
| 2 | 106 | 275 | 93 | 46 |
| 3 | 76 | 155 | 127 | 46 |
| 4 | 93 | 127 | 128 | 46 |

Since the amount of energy required to circulate fluid through a column increases with the height of the column, it is generally desirable to limit the height of column 14 to 5 meters or so. Taller columns could be used but would be disadvantaged by increased pumping costs unless the wastewater is received under pressure.

An injection port 20 is provided at the bottom of column 14. A fluid removal port 22 is provided at the upper end of column 14. A recycling path 23 is provided to permit recycling of fluid from at or near the top of column 14 to at or near the bottom of column 14. Further details of the construction of reactor 14 are described below.

In operation, supersaturation conditions for struvite (or a struvite analog, or another desired solid reaction product) are maintained within column 14. The struvite solubility product $K_{sp}$ is given by:

$$K_{sp}=[Mg^{2+}]_{eq}[NH_4^+]_{eq}[PO_4^{3-}]_{eq}$$

where the activities of the different species (i.e. $[Mg^{2+}]_{eq}$, $[NH_4^+]_{eq}$, and $[PO_4^{3-}]_{eq}$) are measured respectively as soluble magnesium, ammonia and orthophosphate at equilibrium. The supersaturation ratio (SSR) is given by:

$$SSR=[Mg^{2+}][NH_4^+][PO_4^{3-}]/K_{sp}.$$

Increases in the SSR drive crystallization. It is desirable to maintain the SSR in the range of abut 2 to 5 in the vicinity of injection port 20. In some currently preferred embodiments of the invention the SSR is maintained in the range of about 3 to 4. As the SSR within column 14 is increased past a SSR of about 4 or 5, the crystals of product which form upon the introduction of wastewater into column 14 tend to decrease in size. If too many of the crystals which form initially are too small then the efficiency with which large pellets of product are formed within the reactor may be reduced.

Measuring the SSR directly can be complicated because ammonia and phosphate have different forms depending upon the pH. The activity coefficients for ammonia and phosphate are pH dependent and are difficult to estimate. Therefore, where estimates of $K_{sp}$ are based upon measured concentrations of ionic species, the estimates of $K_{sp}$ can be pH dependent. It is typically simpler to measure the conditional solubility of the end product (e.g. struvite) under various operating conditions directly and to control the operation of reactor 12 based upon measured concentrations of one or more species.

It is typically the case that the composition of wastewater from a given source will be relatively constant over time or only slowly changing. Where this is the case it may be sufficient to control the pH of the wastewater within column 14 to have a set value and to adjust the set pH value or other parameters of the operation of column 14 periodically to maintain the SSR within the desired range.

Figure 2:
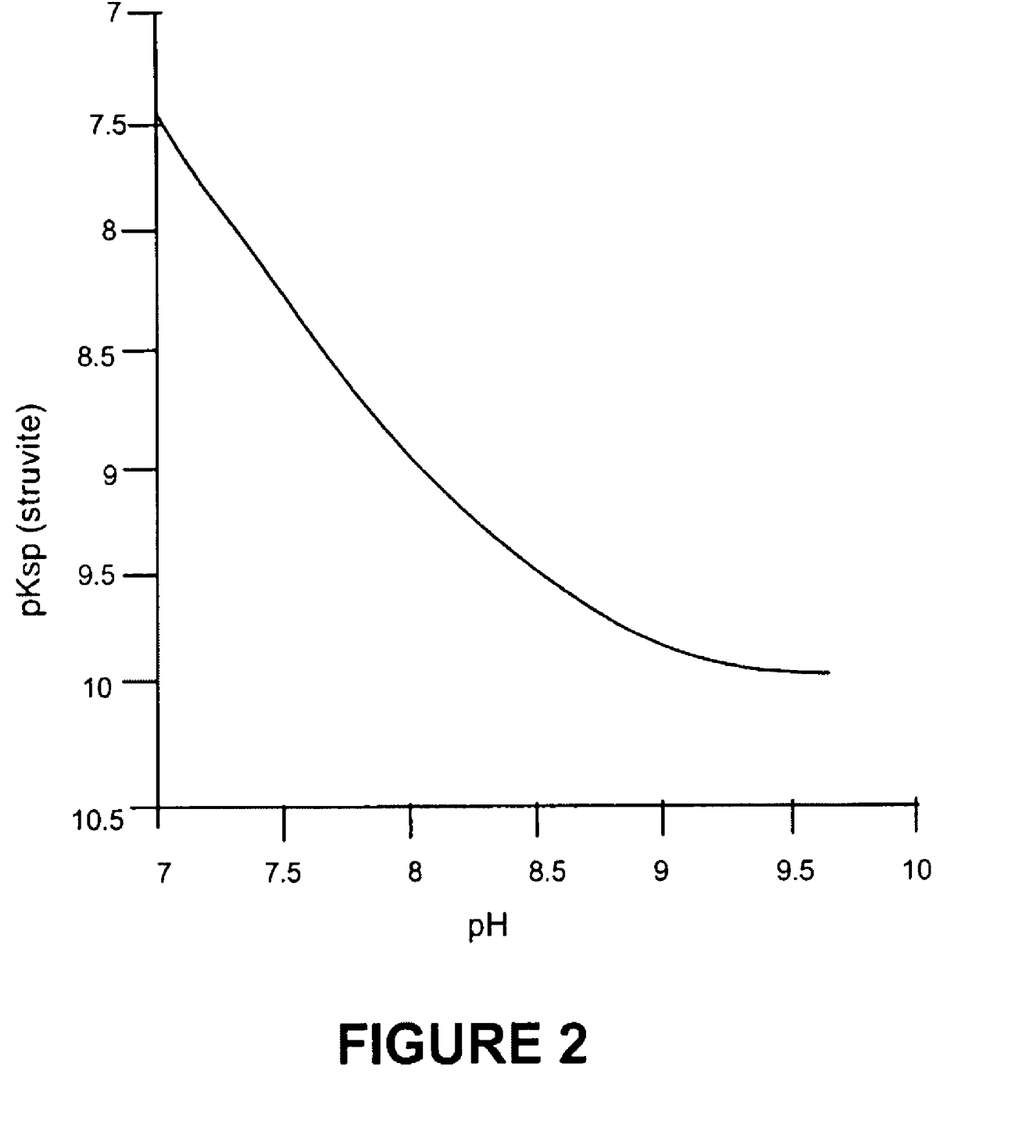
FIG. 2 is a graph illustrating solubility of struvite as a function of pH.

In the embodiment illustrated in FIG. 1, the SSR is controlled by adjusting the pH of the liquid within column 14, adding magnesium ions, or both. FIG. 2 shows that the solubility of struvite decreases sharply with increasing pH. Increasing the pH by adding a base, such as NaOH can therefore be used to increase the SSR within column 14. For wastewater from some typical sources, the SSR can be increased to levels sufficient to achieve acceptable phosphate removal by raising the pH by 0.5 to 1.5 units. Embodiments of the invention have been operated satisfactorily with pH in section 15A of column 14 the range of about 7.4 to 7.5. For phosphate removal rates exceeding 90% it was found necessary to increase pH to 8.3.

For struvite crystallization it is generally desirable to add magnesium ions to provide a stoichiometric mixture having a ratio of Mg:N:P of approximately 1:1:1. Wastewater from many sources has less magnesium than is desirable for the most efficient crystallization of struvite. In general, for a fixed ratio of N:P, it has been found that increasing the concentration of Mg tends to increase the amount of phosphate that can be removed. It has been found that the average P-removal ratio increases almost linearly with an increase in the molar ratio of Mg:P in cases where the Mg:P ratio is below unity and the system is therefore under-optimized for removal of phosphate.

The best way to control SSR depends upon the quality of wastewater entering system 12. Depending upon factors such as the pH of the entering wastewater, the amount of dissolved gases in the wastewater, the temperature, the presence in the wastewater of species which may inhibit crystallization, how close the wastewater is to saturation, etc. it may be more cost effective to control SSR in column 14 by adjusting pH, adjusting the concentration of cations, or by some combination of adjusting pH and adjusting the concentration of cations in column 14.

In the embodiment of FIG. 1, SSR is controlled by a supersaturation controller 30. Supersaturation controller may comprise any suitable process controller. Suitable programmable process controllers are widely available. For example, proportional feedback controllers may be used to implement supersaturation controller 30. Those skilled in the field of this invention are familiar with the selection and programming of such controllers.

Supersaturation controller 30 receives as an input a signal from a pH probe 32. pH probe 32 is located in column 14 just upstream from an initial mixing zone 33. Above mixing zone 33, the influent wastewater (including any recycled wastewater) and any chemicals added to control the pH within column 14 are substantially fully mixed.

Supersaturation controller 30 controls the addition into column 14 of a base, such as sodium hydroxide (NaOH), a source of cations, such as magnesium, which may be provided in the form of a magnesium chloride solution, or both. In the illustrated embodiment, supersaturation controller 30 controls a metering mechanism 34 which meters a sodium hydroxide solution from tank 35 into column 14 and a metering mechanism 36 which meters a magnesium chloride solution from tank 37 into column 14. Any suitable metering mechanisms may be used to control the introduction of the chemicals used to control SSR into column 14. Such metering mechanisms may include pumps, variable valves, or the like. A wide range of suitable metering mechanisms are available commercially.

Supersaturation controller 30 also controls a flow control mechanism 38 which determines how much fluid which has already passed through column 14 is recycled in recycling path 23. Flow control mechanism 38 typically includes a feed pump which may be a low shear pump. The recycle ratio provides a measure of the proportion of flow introduced at nozzle 20 that is recycled via path 23. The recycle ratio RR is provided by:

$$RR = \frac{Q_r}{Q_{t\text{-}inf}} \quad (1)$$

where $Q_r$ is the recycle flow and $Q_{t\text{-}inf}$ is the total influent flow into column 14.

In one embodiment of the invention, supersaturation controller 30 comprises a pH controller component 30A which meters a basic (i.e. alkaline) solution from tank 35 to maintain the pH at pH sensor 32 at a desired value. Supersaturation controller 30 also includes a SSR controller component 30B which controls the proportion of recycled wastewater entering column 14 through recycle loop 23 to fresh wastewater entering column 14 from inlet 13 to adjust the SSR and, if necessary adds magnesium ions from tank 37 to keep the SSR within a desired range. In the illustrated embodiment, supersaturation controller 30 also includes a flow control component 30C which controls an overall flow of fluid through column 14.

SSR controller component 30B may obtain real-time feedback from one or more sensors that monitor temperature, ionic concentrations, pH and other factors that affect the SSR. In some typical applications the composition of wastewater entering reactor 12 is only very slowly changing, temperature is only slowly changing and pH is maintained within a desired range by pH controller component 30A. In such applications SSR controller component 30B need only to be adjusted periodically based upon measurements indicative of SSR. Such periodic measurements and adjustments may be performed manually or under automatic control.

Nozzle 20 injects wastewater into column 14 in a turbulent flow. In operation, an upward flow of fluid is maintained within column 14. The velocity of the flowing fluid decreases as the fluid enters each successive section 15. Crystals of struvite form as wastewater enters column 14. The crystals are urged upward in the flowing fluid and form a fluidized bed. The fluidized bed extends through several sections 15. The crystals grow through a combination of crystal growth and aggregation. As the crystals grow, they become heavier and tend to move downward within column 14.

Since the average upward fluid velocity is different in each of sections 15, particles of struvite tend to become classified by size in different sections 15. Initially all of the particles are small. The particles in column 14 grow through crystal growth processes and by agglomeration. As the crystals grow, some of the crystals become large enough to drop into lower sections within column 14.

Over time, the largest particles tend to accumulate in section 15A. The smallest particles tend to accumulate in section 15D. Intermediate-sized particles tend to become located within intermediate sections 15B and 15C. Column 14 may include more intermediate sections to provide a finer-scaled classification of particles by size in the fluidized bed within column 14.

Fluid flows upward through column 14 at a rate sufficient to maintain desired average upward fluid velocities in the different sections. The average upward fluid flow velocities in each section 15 can be ascertained by dividing the flow rate by the cross sectional area of the section.

The average fluid flow velocity in the lowermost section is sufficient to maintain struvite pellets in suspension. This flow velocity is typically in excess of 100 cm/min. In some embodiments of the invention the average upward fluid flow rate is about 500 cm/minute in section 15A. In general, it is desirable to maintain a relatively high fluid velocity in the section from which the struvite pellets are harvested. This velocity is advantageously in excess of 400 cm/minute and, in some embodiments can be significantly higher, for example, 800 to 1000 cm/minute.

The upward flow velocity in the uppermost section of column 14 is preferably much lower than it is in the lowermost section. For example, in some embodiments of the invention the upward flow velocity in the uppermost section 15 averages 75 cm/minute or less, preferably 55 cm/min or less. In one embodiment of the invention the average upward flow velocity in section 15D is approximately 50 cm/minute.

The rate at which wastewater flows through column 14 can be controlled by adjusting inlet feed pump 39 and recycle flow control mechanism 38 to provide a desired combined flow. In the illustrated embodiment, flow rate is controlled by a flow rate controller component 30C incorporated in supersaturation controller 30.

Recycle path 23 includes a clarifier 50 for removing ultrafine particles from the effluent of reactor 12. An effluent outlet 52 allows effluent to be drawn off from reactor 12.

Reactor 12 optionally includes an air stripping column 54. Air stripping column 54 removes dissolved carbon dioxide from the recycled wastewater passing through it and consequently increases the pH of the recycled wastewater. Increasing the pH by way of an air stripper reduces the need to add a base, such as NaOH to keep the SSR within a desired range. Air stripping column 54 may be located in recycle path 23, as shown, or may be in a fluid path separate from recycling path 23. Where air stripper 54 is in a flow path separate from recycling path 23, the rate at which fluid from column 14 is cycled through the air stripping column can be controlled, for example, by pH controller component 30A. This provides additional control over the pH of the fluid within column 14 and can reduce or, in some cases eliminate, the need to add alkaline solution from tank 35.

After reactor 12 has been running for sufficient time, first section 15A will contain pellets of struvite which are large enough to be harvested. In the prototype reactors operated by the inventor, the first struvite pellets have been ready for harvesting in about 8 to 20 days.

An isolation valve 40 is located in a lower portion of column 14 and isolates at least a major portion of section 15A from the upper parts of column 14. Isolation valve 40 is preferably located at or below the boundary between section 15A and section 15B. The pellets which have accumulated within section 15A can be harvested by opening isolation valve 40 and closing valves 42 and 44 to temporarily isolate section 15A. When section 15A is isolated, fluid can continue to flow into the upper part of column 14 by way of bypass conduit 41 which extends from input 20 to a location in column 14 above isolation valve 40. The contents of section 15A, including the struvite pellets which have accumulated in section 15A, can be harvested by opening valve 46.

After having been removed from column 14 the pellets can be dried. Any suitable drying system may be used. In the illustrated embodiment, the pellets fall onto screen 48 from where they are deposited onto a drying conveyor 49. Fluid from section 15A falls through screen 48. The fluid can be captured and reintroduced into system 12 or otherwise disposed of.

The quality and size of struvite pellets grown in reactor 12 depends upon a wide range of factors including SSR, flow rate in column 14, and crystal age. Lower SSRs, greater crystal age, and greater upflow velocities in column 14 all tend to yield harder, and in some cases larger, struvite pellets.

The crystal retention time, CRT, for a group of pellets accumulated within column 14 may be defined as the number of days that have passed since that volume of pellets have been removed from the reactor. For example, if the settled volume of all pellets in column 14 is found to be 7.8 L and 1.3 L of pellets are harvested from section 15A of the reactor every 2 days then the CRT for the accumulated pellets would be 12 days. It has been found in some experiments that CRT of 8-12 days has generated good sized pellets that have sufficient structural strength to endure harvesting and drying. In some embodiments of the invention the process is operated to provide a CRT of 4 days or more and, in some cases, 1 week or more.

In a prototype reactor constructed according to an embodiment of the invention, it was found that up to about 90% of the phosphates in wastewater could be removed in the form of struvite pellets. The struvite pellets had diameters in the range of about 0.5 mm to about 10 mm. The effluent from the process was found to have phosphate concentrations as low as 5 mg/L.

Figure 3:
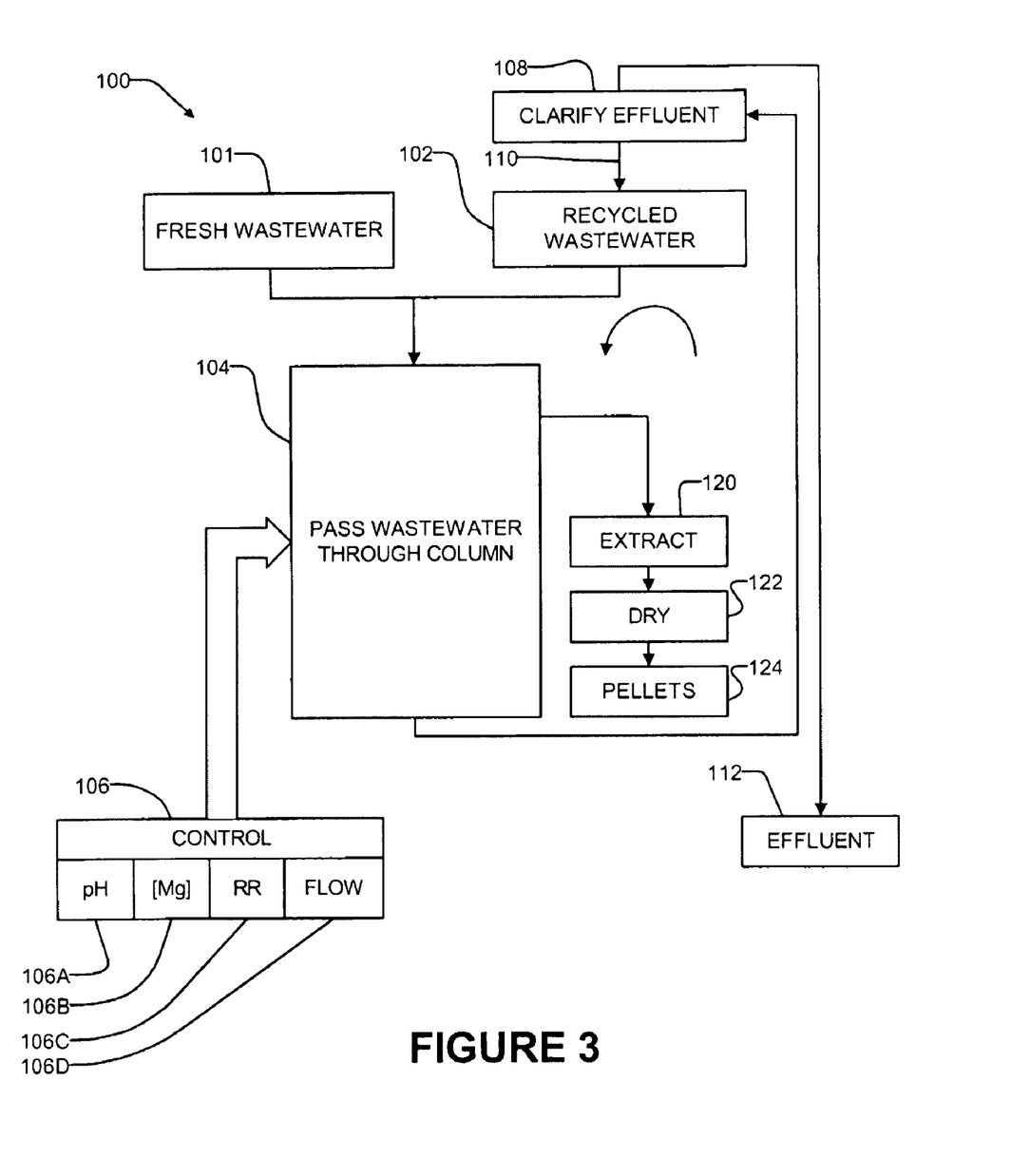
FIG. 3 is a flow chart which illustrates a method for removing phosphorus and nitrogen from wastewater in the form of struvite.

FIG. 3 illustrates a method 100 according to an example embodiment of the invention. Method 100 takes fresh wastewater 101 and recycled wastewater 102 and passes the wastewater into column in block 104. A control process 106 continuously controls pH in block 106A, concentration of magnesium ions in block 106B, recycle ratio in block 106C and flow rate in block 106D.

Effluent from the column is clarified in block 108. Some of the effluent is recycled as indicated by line 110 to provide recycled wastewater 102. The remaining effluent is taken off at block 112.

Periodically pellets of struvite are extracted from the column in block 120. The pellets are dried at block 122 to provide dry pellets at block 124. The dry pellets may be used in various applications, for example, as a fertilizer.

Where a component (e.g. a reactor, controller, conduit, pump, metering mechanism etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- The capacity of reactor 12 can be increased by operating multiple columns 14 in parallel to one another.
- For wastewater having phosphate concentrations in excess of 200 mg/L it may be desirable to provide an initial pretreatment stage which reduces the phosphate concentration upstream from reactor 12. For example, the pretreatment stage could reduce phosphate concentration to a value of less than about 200 mg/L.
- The reactor could include a facility for adding ammonia as a further, or alternative, mechanism for controlling the SSR.
- The sections of reactor 14 do not need to be round in cross section. Other shapes are also possible, for example, the sections could be polygonal.
- The number of sections could be varied.
- The reactor can be operated to maximize removal of ammonium by creating conditions under which the ammonium ions limit the production of struvite.
- While it is currently considered preferable that the transitions between sections 15 of column 14 be sharp stepwise transitions, some or all of the transitions could be tapered. For example the transitions between the lowermost few sections 15 in column 14 could be tapered. Where column 14 includes tapered transitions, it is considered advantageous that the tapered transitions be step-like transitions. However, in some cases the taper angle could be 45 degrees or more or 60 degrees or more.
- The components of supersaturation controller 30 are not required to be commonly located or housed but could be distributed in any suitable manner.
- The cross-sectional area of any section 15 is not necessarily constant along the section but could vary in a manner that does not interfere significantly with particle size classification within column 14.

Accordingly, the scope of the invention is to be construed in accordance with the substance defined by the following claims.

What is claimed is:

1. A fluidized bed reactor for use in removing solutes from wastewater, the reactor comprising
 a column comprising a substantially vertically oriented conduit having a harvesting section and at least two vertically sequential sections located above the harvesting section, a cross sectional area of the conduit increasing between adjacent ones of the sections;
 an inlet for wastewater in the column in or below the harvesting section;
 a recycling path extending from an outlet in an upper portion of the conduit to the inlet; and,
 a controller configured to control a supersaturation ratio for struvite, a struvite analog, or a phosphate compound to have a value within a desired range within the harvesting section by, at least in part, controlling a recycling ratio of a rate at which wastewater is being introduced into the column by way of the recycling path to a total rate at which wastewater is being introduced into the column
 wherein, in operation of said reactor, pellets comprising crystals of struvite, the struvite analog or the phosphate compound form a fluidized bed in the column and grow from said solutes, and said pellets are capable of being extracted from said harvesting section.

2. A fluidized bed reactor according to claim 1 wherein the controller is configured to control the supersaturation ratio to have a value between 2 and 5.

3. A fluidized bed reactor according to claim 1 wherein the controller is configured to control the supersaturation ratio to have a value between 3 and 4.

4. A fluidized bed reactor according to claim 1 wherein the controller is connected to control a metering mechanism configured to introduce a cation-containing solution into the column in response to a cation control input from the controller.

5. A fluidized bed reactor according to claim 1 wherein the controller is connected to control a metering mechanism configured to introduce an ammonia-containing solution into the column in response to a ammonia control input from the controller.

6. A fluidized bed reactor according to claim 1 comprising a flow controller connected to control the total rate at which wastewater is being introduced into the column to have a value such that an average upward fluid velocity within the harvesting section is at least 400 cm/min.

7. A fluidized bed reactor according to claim 1 comprising a flow control mechanism in the recycle path.

8. A fluidized bed reactor according to claim 7 wherein the flow control mechanism comprises a feed pump controlled by the controller.

9. A fluidized bed reactor according to claim 7 comprising an inlet feed pump controlled by the controller and connected to deliver wastewater into the column.

10. A fluidized bed reactor according to claim 9 wherein the controller is configured to control the recycling ratio by adjusting operation of the inlet feed pump and flow control mechanism.

11. A fluidized bed reactor according to claim 1 wherein the cross sectional area of the conduit increases stepwise between the adjacent ones of the sections.

12. A fluidized bed reactor according to claim 11 wherein the cross sectional area of the conduit increases stepwise by a factor of at least 1½ between the adjacent ones of the sections.

13. A fluidized bed reactor according to claim 1 wherein the at least two vertically sequential sections above the harvesting section comprise three or more sections.

14. A fluidized bed reactor according to claim 13 wherein the inlet is oriented substantially vertically and is configured to direct a turbulent jet of influent wastewater upward into the column.

15. A fluidized bed reactor according to claim 14 wherein a ratio of a cross sectional area of a topmost one of the sections to a cross sectional area of the harvesting section is at least 10:1.

16. A fluidized bed reactor according to claim 1 wherein the cross sectional area of the conduit increases stepwise by a factor of at least 5 between a next-to-topmost one of the sections and a topmost one of the sections.

17. A fluidized bed reactor according to claim 16 comprising a pH control system connected to receive a signal from the pH sensor, the pH control system connected to control a metering mechanism configured to introduce an alkaline substance into the column below the pH sensor in response to a pH control input from the pH controller.

18. A fluidized bed reactor according to claim 1 comprising an isolation valve located in the column to isolate at least a major portion of the harvesting section and a bypass conduit connected to direct fluid from the input to a location in the column above the isolation valve when the isolation valve is closed.

19. A fluidized bed reactor according to claim 1 comprising a pH sensor connected to the controller and located in the harvesting section above a mixing zone.

20. A fluidized bed reactor according to claim 17 wherein the pH controller is configured to control the pH at the pH sensor to a value in the range of 7.4 to 8.5.

21. A fluidized bed reactor according to claim 1 wherein a ratio of a cross sectional area of a topmost one of the sections to a cross sectional area of the harvesting section is at least 10:1.

22. A fluidized bed reactor according to claim 1 comprising an air stripper located in the recycling path.

23. A fluidized bed reactor according to claim 1 comprising an air stripper located in an air stripper path separate from the recycling path.

24. A fluidized bed reactor according to claim 1 comprising a clarifier located in the recycling path.

25. A fluidized bed reactor according to claim 1 wherein the column has a height of at least 5 meters.

26. A fluidized bed reactor according to claim 1 wherein the sections of the column are round in cross section.

27. Apparatus for deriving phosphorus-containing solids from wastewater, the apparatus comprising:
 a vessel having a recycling path extending from an upper portion of the vessel to an inlet in a lower portion of the vessel, the upper portion of the vessel having a cross-sectional area greater than a cross-sectional area of the lower portion of the vessel;
 a pump connected to generate a flow of wastewater through the recycling path;
 a controller configured to control a supersaturation ratio for the phosphorus-containing solid in a zone within the vessel at least in part by controlling a ratio of the flow of wastewater through the recycling path to a total flow of wastewater through the vessel
 wherein, in operation of said apparatus, pellets comprising crystals of struvite, the struvite analog or the phosphate compound form a fluidized bed in the column and grow and said pellets are capable of being extracted from said lower portion.

28. Apparatus according to claim 27 comprising a nozzle at the inlet wherein the nozzle is connected to carry both the flow of wastewater from the recycling path and a flow of wastewater incoming from a source of wastewater.

29. Apparatus according to claim 27 comprising an air stripping column in the recycle path.

30. Apparatus according to claim 27 comprising an air stripper having an input connected to receive wastewater and an outlet connected to deliver wastewater to the vessel wherein the controller is configured to control a rate of flow of the wastewater through the air stripper.

31. Apparatus according to claim 27 comprising a metering mechanism connected to deliver a material containing magnesium ions from a material source into the vessel under control of the controller.

32. Apparatus according to claim 27 wherein the controller comprises a proportional feedback controller connected to receive an input signal from a pH sensor arranged to measure pH at a location in the vessel.

33. Apparatus according to claim 27 wherein the vessel comprises a column comprising a vertically arranged series of sections wherein each of the sections has a cross sectional area greater than that of any adjacent lower one of the sections.

34. Apparatus according to claim 33 wherein the sections comprise cylindrical tubes of different diameters.

35. A fluidized bed reactor comprising:
a column comprising a substantially vertically oriented conduit having a harvesting section in a lower portion thereof, the conduit configured such that a cross sectional area of the conduit increases with elevation above the harvesting section;
an inlet port in the column in or below the harvesting section;
a recycling path extending from an outlet in an upper portion of the conduit, the recycling path reentering the conduit in or below the harvesting section; and,
a controller configured to control a supersaturation ratio for struvite, a struvite analog, or a phosphate compound to have a value within a desired range within the harvesting section by, at least in part, controlling a recycling ratio of a rate at which wastewater is being introduced into the column by way of the recycling path to a total rate at which wastewater is being introduced into the column
wherein, in operation of said reactor, pellets comprising crystals of struvite, the struvite analog or the phosphate compound form a fluidized bed in the column and grow and said pellets are capable of being extracted from said harvesting section.

36. A fluidized bed reactor according to claim 35 wherein the controller is configured to control the supersaturation ratio to have a value between 2 and 5.

37. A fluidized bed reactor according to claim 35 comprising a flow controller connected to control the total rate at which fluid is being introduced into the column to have a value such that an average upward fluid velocity within the harvesting section is at least 400 cm/min.

38. A fluidized bed reactor according to claim 35 wherein the conduit comprises a plurality of cylindrical sections and the cross sectional area of the conduit increases stepwise between adjacent ones of the sections.

39. A fluidized bed reactor according to claim 35 wherein the inlet port is oriented substantially vertically and is configured to direct a turbulent jet of influent fluid upward into the column.

* * * * *